United States Patent [19]

Slaker et al.

[11] Patent Number: 5,408,546
[45] Date of Patent: Apr. 18, 1995

[54] OPTICAL FIBER PRESSURE TRANSDUCER AND METHOD OF MANUFACTURING THE SAME

[75] Inventors: Bradley F. Slaker, Plymouth; Richard L. Little, Wayzata; Bruce L. Funk, Maplewood, all of Minn.

[73] Assignee: MedAmicus, Inc., Minneapolis, Minn.

[21] Appl. No.: 160,410

[22] Filed: Dec. 2, 1993

[51] Int. Cl.6 .............................................. G02B 6/02
[52] U.S. Cl. ........................................ 385/12; 385/13; 385/16; 385/30
[58] Field of Search ...................... 385/12, 13, 16, 80, 385/30, 92, 139, 146, 147, 18; 128/748, 667, 675; 604/282; 73/705, 715; 250/227.19, 227.21, 231.19

[56] References Cited

U.S. PATENT DOCUMENTS

| | | | |
|---|---|---|---|
| 3,893,451 | 7/1975 | Durand et al. | 128/2.05 |
| 4,155,356 | 5/1979 | Venegas | 128/145.6 |
| 4,214,593 | 7/1980 | Imbruce et al. | 128/748 |
| 4,252,131 | 2/1981 | Hon et al. | 128/748 |
| 4,387,711 | 6/1983 | Merry | 128/207.15 |
| 4,484,585 | 11/1984 | Baier | 128/748 |
| 4,502,490 | 3/1985 | Evans et al. | 128/780 |
| 4,535,766 | 8/1985 | Baum | 128/204.23 |
| 4,621,646 | 11/1986 | Bryant | 128/692 |
| 4,635,631 | 1/1987 | Izumi | 128/204.23 |
| 4,672,974 | 6/1987 | Lee | 128/673 |
| 4,701,614 | 10/1987 | Jaeger et al. | 385/13 X |
| 4,813,431 | 3/1989 | Brown | 128/748 |
| 4,872,483 | 10/1989 | Shah | 137/557 |
| 4,971,034 | 11/1990 | Doi et al. | 128/6 |

OTHER PUBLICATIONS

"Uberbacher" IBM Technique Disclosure Bulletin vol. 18 No. 2 Jul. 1975 Fiber Optic Illuminated Switch.
"Sheridan Flexibend Oral/Nasal Tracheal Tube", 1 page, Copyright 1988 No Month.
"Infant Star High Frequency Ventilator", 4 pages, Revision date Sep. 1990.
"Star Sync Patient Triggered Interface", 2 pages, Revision date Feb. 1991.
"Sheridan/HVT; Sheridan/CF; Sheridan/Uncuffed", 1 page, Copyright 1988 No Month.
"Spiral-Flex Reinforced Tracheal Tube", 1 page, Patent date 1986 No Month.
"Sheridan Sher-I-Bronch", 1 page, Copyright 1988 Jan. 1988.

Primary Examiner—Rodney B. Bovernick
Assistant Examiner—Phan Thi Heartney
Attorney, Agent, or Firm—Moore & Hansen

[57] ABSTRACT

The present invention provides an improved method of manufacturing a pressure transducer of the optical fiber type and an improved pressure transducer of that type, the method including the steps of providing a housing having a greatest interior dimension less than twice the diameter of the optical fibers, deforming the housing by applying pressure thereto such that an interior dimension of the housing along one axis thereof exceeds twice the diameter of the optical fibers, and releasing the pressure on the housing so that the housing substantially resumes its undeformed state and fixedly traps the optical fibers at a preselected location within the housing. An improved pressure transducer of the optical fiber type has a housing receiving the distal end of an optical path, the housing including an aperture, and a pressure sensitive membrane disposed in covering relation to the aperture under tension. The aperture has a substantially nonlinear circumference, preferably in the shape of a circle that was laid on the outer cylindrical surface of the housing as a template for the aperture.

39 Claims, 5 Drawing Sheets

OPTICAL FIBER PRESSURE TRANSDUCER AND METHOD OF MANUFACTURING THE SAME

The present invention relates in general to optical fiber pressure transducers and in particular to a method for manufacturing such transducers and to an improved optical fiber pressure transducer.

BACKGROUND OF THE PRESENT INVENTION

Examples of optical fiber types of pressure transducers used for medical purposes can be found in U.S. Pat. No. 5,005,584 to Little. Generally, the optical fiber type of pressure transducer converts sensed pressure variations into a light modulated signal. The device is calibrated so that the light signal is proportional to pressure. An optical pathway is the preferred mode of light transmission from a light source usually disposed within a control unit to the pressure sensor and back to the control unit. This optical pathway is usually provided by optical fibers or leads. Such leads may be in the configuration of a single fiber which serves to both send and receive light signals to and from the transducer, in the form of two optical fiber leads where one fiber serves to transmit and one to receive light signals, or in the form of a fiber bundle where two or more fibers function together in the manner of a single fiber. The proximal end of fiber optic pathway terminates at a connection site with the control unit and its distal end terminates within a pressure transducer assembly. Light exits the transmitting fiber or fibers, crosses a gap, and is reflected off a reflective surface into the return fiber or fibers. The optical pathway thus serves as a passage for the transmission of pressure indicating signals from the pressure transducer assembly to the control unit, which in turn provides an output signal to a display device.

The pressure transducer assembly includes a housing that receives the distal end of the optical pathway. A cutout or window is made into the side of the housing. The window is often enveloped by a pressure sensitive member that serves to modulate the intensity of the light transmitted from the pressure transducer assembly back to the control unit on the return side of the optical pathway. One surface of the pressure sensitive member is exposed to the pressure desired to be measured and the opposing surface is exposed to a reference pressure, normally ambient atmospheric pressure inside the housing. The membrane is deflected into the window by the pressure and occuludes a portion of the light transmitted. As the pressure externally changes, the membrane will variably occlude the light and thus modulate the light signal accordingly.

The pressure transducers used by medical practitioners are small and often hand assembled. In some embodiments, the construction of the pressure transducer assembly requires inserting the optical fibers within a cylindrical bore and then affixing them in place. Conventional techniques for holding the fibers in their preselected positions include using a potting or cementing material placed within the housing. While useful, this method of fixing the optical fibers in place necessitates insertion of potting or cementing material into the housing along with the fibers. This extra step and the additional material increases the risk of contamination of the transducer assembly, an undesirable situation where sterility is prized.

Current housing configurations include an aperture having a square or curved configuration with the pressure sensitive membrane engaging the aperture in a covering or enveloping relation thereto. During periods where the sensed pressure is decreasing relative to the reference/ambient atmospheric pressure, the returning, modulated light signal may exhibit hysteresis. The hysteresis has been found to arise from the manner in which the pressure sensitive membrane deforms inwardly into the housing aperture as the pressure to be measured increases. This effect must be accounted for in order for the pressure transducer to provide accurate readings.

It would be desirable to provide an improved method of manufacturing an optical fiber pressure transducer and a transducer that exhibited hysteresis to a smaller degree as presently available transducers.

SUMMARY OF THE PRESENT INVENTION

It is an object of the present invention to provide a new and improved manufacturing method and apparatus not subject to the foregoing disadvantages.

It is another object of the present invention to provide a method of manufacturing a pressure transducer of the optical fiber type wherein the distal end of the optical pathway is held in a preselected position within the transducer housing without the use of potting or cementing materials.

It is another object of the present invention to provide a method of manufacturing an optical fiber pressure transducer that includes polishing the ends of the fibers by using heat.

It is yet another object of the present invention to provide a pressure transducer of the optical fiber type that is less subject to hysteresis effects.

It is still another object of the present invention to provide a pressure transducer of the optical fiber type having a housing seating a pressure responsive membrane in tension over a circularly configured aperture.

The foregoing objects of the present invention are provided by an improved method of manufacturing a pressure transducer of the optical fiber type and an improved pressure transducer of that type. According to the present invention an improved method of manufacturing a pressure transducer comprises providing a housing having a greatest interior dimension less than twice the diameter of the optical fibers, deforming the housing by applying pressure thereto such that an interior dimension of the housing along one axis thereof exceeds twice the diameter of the optical fibers, and releasing the pressure on the housing so that the housing substantially resumes its undeformed state and fixedly traps the optical fibers at a preselected location within the housing. The method further contemplates that the housing has an aperture extending between the inner and outer surfaces thereof and that a pressure sensitive membrane is placed over the aperture under tension. The membrane may include a circular sleeve having an inner diameter less than the outer diameter of the housing, wherein the method contemplates dilating the membrane such that its inner diameter is greater than that of the housing outer diameter and then placing the housing within the membrane and allowing the membrane to return to its undilated state. The membrane may be dilated according to the present invention by placing it in a dilating solution such as freon or other known dilating solutions or by applying a pressure differential across the inner and outer surfaces of the membrane such that the membrane expands. The pressure differential may be applied by exposing the outer surface of the membrane to a near vacuum.

An improved pressure transducer of the optical fiber type has a housing receiving the distal end of an optical path, the housing including an aperture, and a pressure sensitive membrane disposed in coveting relation to the aperture under tension. The aperture has a substantially nonlinear circumference, preferably in the shape of a circle that was laid on the outer cylindrical surface of the housing as a template for the aperture.

These and other features and advantages of the present invention will become apparent to those skilled in the art when the following detailed description of the invention is read in conjunction with the accompanying drawings and claims. Throughout the drawings, like numerals refer to similar or identical parts.

DETAILED DESCRIPTION OF THE PRESENT INVENTION

Figure 1:
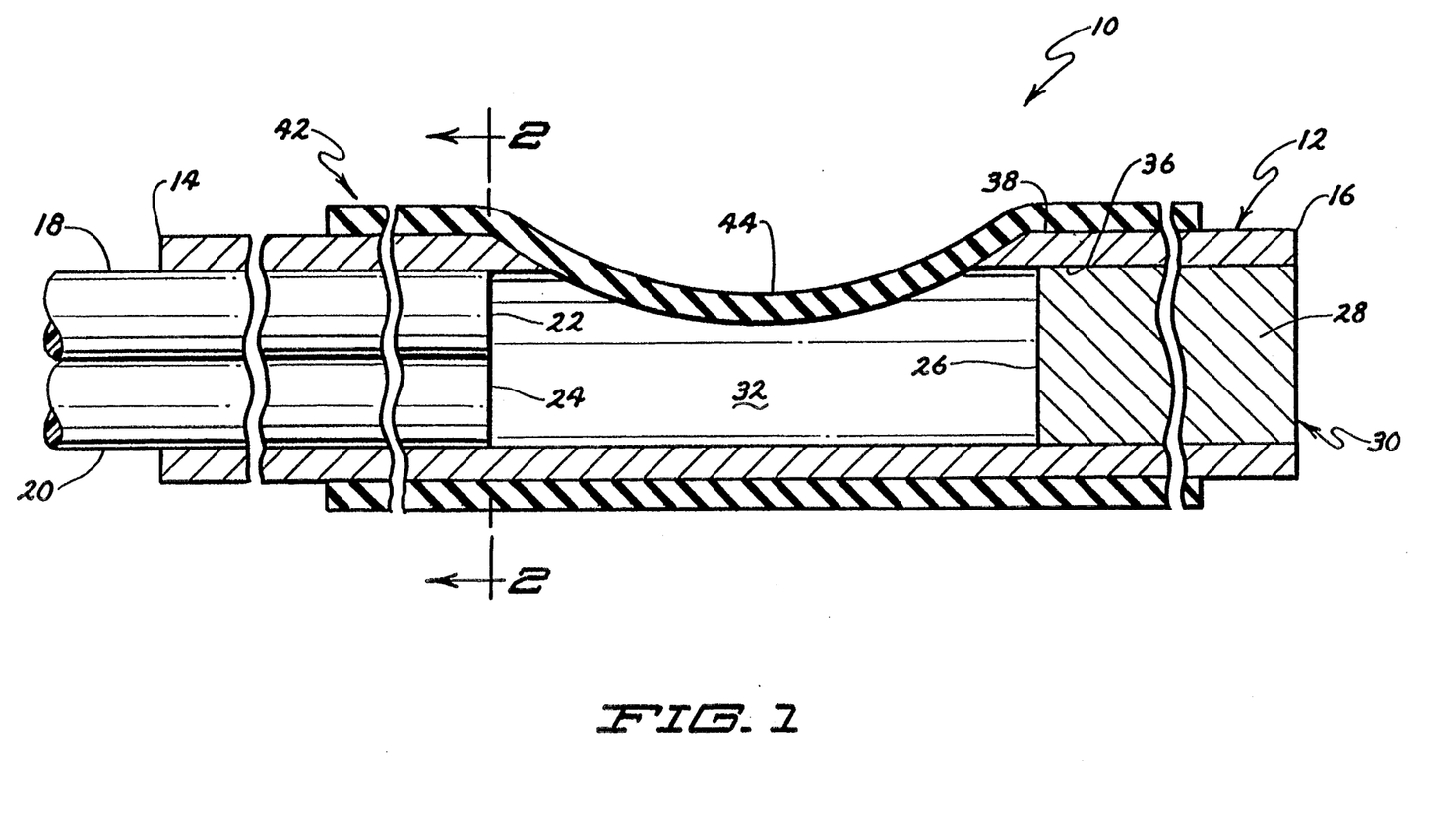
FIG. 1 illustrates in a side elevation, partial cross sectional view an optical fiber pressure transducer of the type manufactured according to the present invention.

In the following description, familiarity with the basic construction of a fiber optic pressure transducer is assumed. The reader is referred to the foregoing Little '584 patent for additional details. Furthermore, it will be understood that the scale of the drawings is not representative of the sizes of fiber optic transducers actually used and that the scale has been exaggerated for purposes of clarity. FIG. 1 illustrates a side elevation, cross sectional view of a pressure transducer assembly 10 in accordance with the present invention. The assembly 10 includes a housing 12 having proximal and distal ends 14 and 16, respectively. Proximal housing end 14 receives a pair of light conducting fibers 18 and 20 that serve, respectively, as the transmitting and receiving paths of an optical pathway. Fibers 18 and 20 are connected at their proximal ends (not shown) to well known control units that generate the initial light signal transmitted via optical fiber 18 to pressure transducer assembly 10 and that evaluate the modulated return signal received via optical fiber 20. Fibers 18 and 20 each have a distal end 22 and 24, respectively, that are optically coupled to each other. The optical coupling is provided by a reflective surface 26 disposed on the proximal end 28 of an end plug 30 received within the distal end 16 of the housing 12. Distal ends 22 and 24 of fibers 18 and 20 are separated from reflector 26 by a gap 32.

Figure 2:
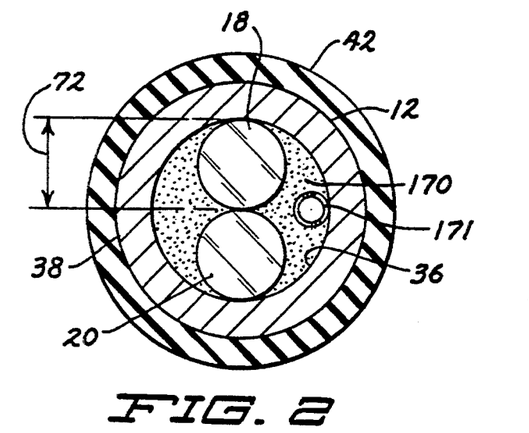
FIG. 2 shows a cross sectional view of an optical fiber pressure transducer in accordance with the present invention taken along cutting plane 2—2 of FIG. 1.
Figure 11:
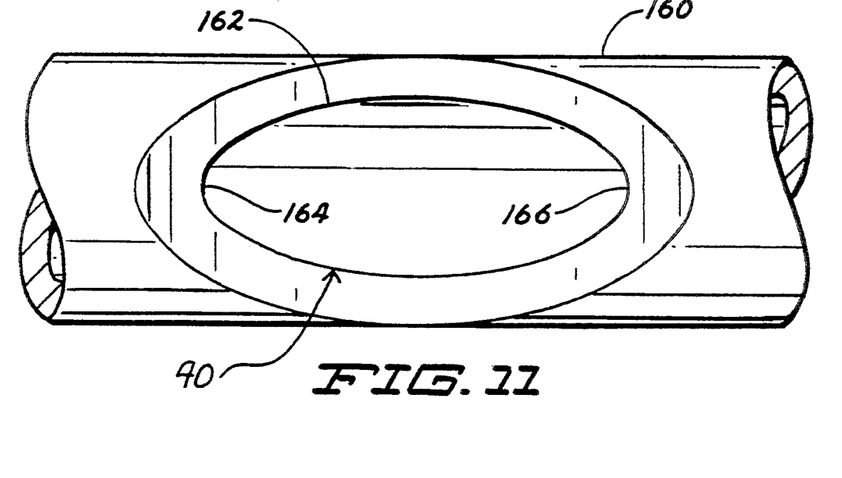
FIG. 11 shows a partial top plan view of the housing shown in FIGS. 1 and 8 and in particular shows the aperture in the housing wall.

Housing 12 generally has the shape of a cylindrical shell as best seen in FIG. 2. Thus, housing 12 has a single, substantially circular wall 34 having inner and outer surfaces 36 and 38, respectively. An aperture 40 (FIG. 11) extends between inner and outer surfaces 36 and 38. Aperture 40 is best seen in FIG. 11.

To sense a change in pressure, a flexible membrane 42 is positioned on housing 12. Flexible membrane 42 is disposed in covering relation to the aperture 40. A pressure sensitive portion 44 of flexible membrane 42 overlies aperture 40 of housing 12. The portion 44 is a pressure sensitive segment that freely flexes and deflects transversely with respect to the path of light as it passes longitudinally across gap 32 between fiber distal ends 22 and 24 via reflector 26. Membrane 42 may take the form of a patch or, as shown in FIGS. 1 and 2, a substantially cylindrical sleeve that embraces the housing 12 in a snug fit therewith. Membrane 42 is preferably manufactured from an elastomeric material, such as a thermoset or thermoplastic polymer. In addition, it is also known in the art to use membranes made from a metallic material. Such pressure sensitive membranes may also be used with the present invention.

Figure 6:
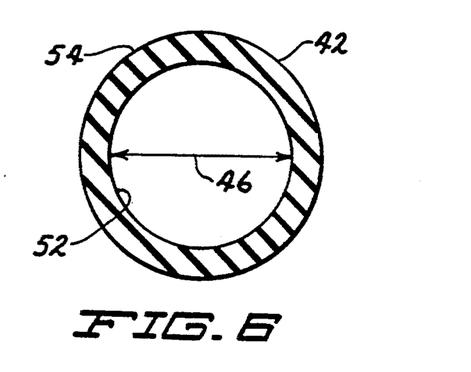
FIG. 6 shows an end view of an undilated pressure sensitive member such as that shown in FIG. 1.
Figure 7:
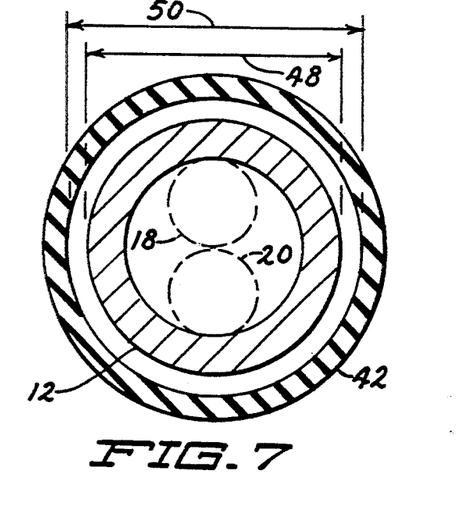
FIG. 7 shows an end view of the transducer housing inserted within a membrane such as that shown in FIG. 6, the membrane having been dilated for easy insertion of the housing therein.

Referring particularly to FIGS. 2, 6 and 7, membrane 42 is secured around the outer surface 38 of housing 12 in covering relation to the aperture 40 so as to be placed in tension in a prestressed condition. For this purpose, membrane sleeve 42, prior to its installation over housing 12, has an inner diameter $d_5$ or 46 less than the outer diameter $d_4$ or 48 of housing 12. Membrane 42 is shown in its normal, undilated condition in FIG. 6. To install membrane 42 on housing 12, it is necessary to dilate membrane 42 such that it has a dilated inner diameter 50 greater than the housing outer diameter 48. Thus, FIG. 7 shows housing 12 and membrane 42 in its dilated condition. As seen in FIG. 7, the dilated inner diameter 50 is larger than the housing outer diameter 48 such that housing 12 can be inserted within membrane sleeve 42. When membrane 42 is made of a silicone material, it may be placed within a solution that causes it to dilate as the solution is absorbed by the silicone membrane. When the silicone membrane reaches the desired state of dilation, it may be slipped over the end of housing 12 in covering relationship to the aperture 40. As the dilating solution evaporates, the membrane sleeve 42 will return to its normal, undilated state, as shown in FIG. 6. Because membrane 42 has a smaller inner diameter 46 than housing outer diameter 50, it will tightly embrace the outer surface 38 of housing 12. Alternatively, membrane 42 may be stretched by creating a pressure differential between the inner surface 52 of membrane 42 and the outer surface 54 thereof. This pressure differential, wherein the pressure on the inner surface 52 is greater than the pressure on the outer surface 54, will cause membrane 42 to stretch radially outwardly so that its inner diameter is greater than the housing outer diameter 48. Once again, housing 12 may be easily inserted within the dilated membrane 42, as shown in FIG. 7.

Regardless of which method of dilating membrane 42 is used, the membrane sleeve 42 is prestressed in tension around housing 12 and over the aperture 40. This prestressing causes the membrane to be initially set at an inwardly flexed condition wherein the pressure responsive segment 44 curves inwardly in the direction of the center of the housing 12. As shown in FIG. 1, the pressure responsive segment 44 assumes somewhat the shape of a segment of a sphere in its inwardly curved position. The membrane sleeve 42 is preferably placed in tension a predetermined extent such that the pressure sensitive segment 44 will have an inward sufficient deflection that it will extend slightly into the path of the light traveling between the distal end 22 of light transmitting fiber 18 and reflector 26. Pressure sensitive segment 44 may freely flex inwardly or outwardly in response to changes in pressure. The initial inward deflection partially blocks the flow of light through the light transmitting circuit provided by fibers 18 and 20 via reflector 26.

In operation, the interior of housing 12 is held at a reference pressure or ambient atmospheric pressure. Thus, the inward initial deflection allows the pressure transducer assembly 10 to sense negative pressures or pressures below atmospheric pressure within the body of a patient. Thus, should the pressure sensed externally of the pressure transducer assembly 10 on the outer surface of the membrane segment 44 decrease, membrane 42 will flex slightly outwardly, thereby permitting a greater passage of light between the distal ends 22 and 24 via reflector 26. This particular change in light transmission will be sensed as a signal indicative of a decrease or negative change in pressure.

Figure 3:
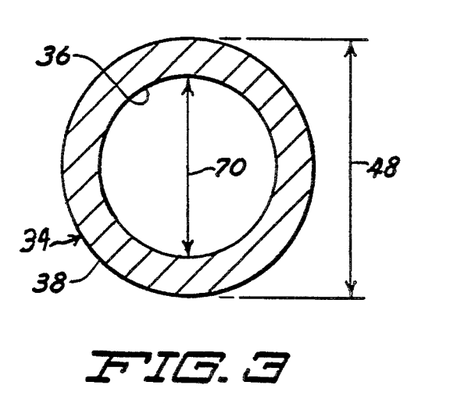
FIG. 3 shows an end view of the pressure transducer housing shown in Figure 1.
Figure 4:
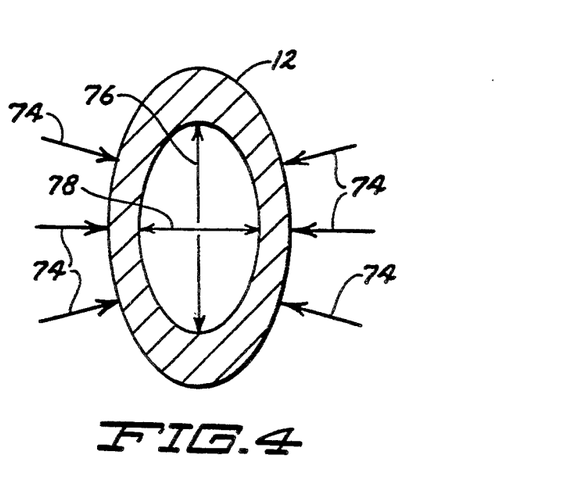
FIG. 4 shows the housing of FIG. 3 in its deformed state due to the application of pressure on opposing sides of the housing.
Figure 5:
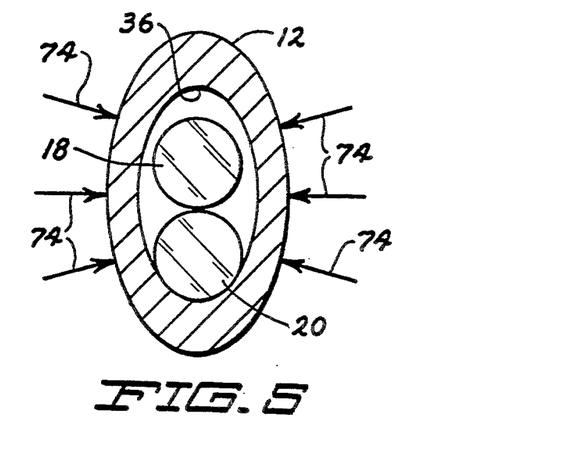
FIG. 5 shows the deformed housing of FIG. 4 and the optical fibers inserted therein.

Referring now to FIGS. 3, 4 and 5, the proper disposition of the optical fibers within housing 12 will be described. FIG. 3 shows housing 12 in its normal state prior to insertion of the fibers 18 and 20 therein. Housing 12 has an inner diameter $d_1$ as indicated by reference numeral 70 that is less than twice the diameter $d_2$ or 72 of optical fibers 18 and 20; that is, the inner diameter 70 of housing 12 is less than the sum of the diameters of optical fibers 18 and 20. To place fibers 18 and 20 within housing 12, housing 12 is deformed into a substantially oval shape by the application of pressure on the outer surface 38, as indicated by arrows 74 in FIG. 4. By applying pressure to substantially opposite sides of housing 12, housing 12 is deformed substantially as shown in FIG. 4 so as to achieve a configuration on its inner surface 36 of a substantially elliptical or oval shape. Pressure can be applied to the housing 12 with a clamp. As shown in FIG. 4, the deformed housing 12 will have a major axis $d_3$ or 76 that is greater than the sum of the diameters of the fibers 18 and 20. In its deformed condition then, optical fibers 18 and 20 may be inserted within housing 12 such that the distal ends 22 and 24, respectively, are aligned with each other and with the edge of aperture 40. When thus placed, the pressure indicated by arrow 74 may be released so that housing 12 returns to its undeformed configuration substantially as shown in FIGS. 2 and 3, thereby trapping optical fibers 18 and 20 therein, as shown in FIGS. 1 and 2. Fibers 18 and 20 will be held firmly in place by the continuous tendency of housing 12 to return to its completely undeformed condition. Because the combined diameters of the two fibers remain greater than the internal diameter 70 of the housing 12, however, housing 12 may remain slightly deformed, depending upon the particular materials used to form the transducer. The tendency of the housing 12 to return to its undeformed condition will create an inwardly directed pressure on fibers 18 and 20, thereby homing them firmly in place within the housing 12. To perform in this manner the housing 12 must be made from a material with spring-like or elastic characteristics. Notable material candidates for such a use are metals, including stainless steel.

Figure 8:
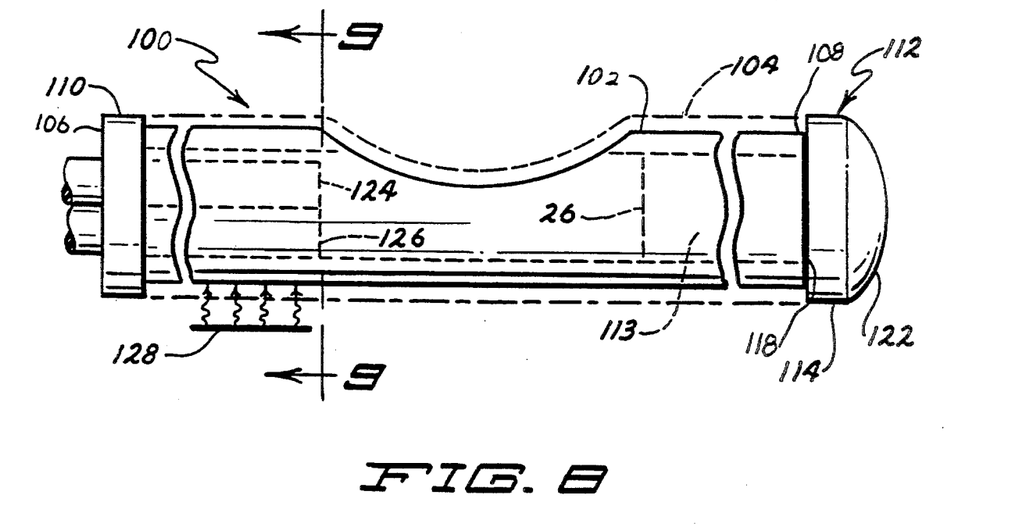
FIG. 8 shows an alternate embodiment of the present invention including a housing/end plug assembly providing a recessed seat for a pressure sensitive membrane.
Figures 9, 10:
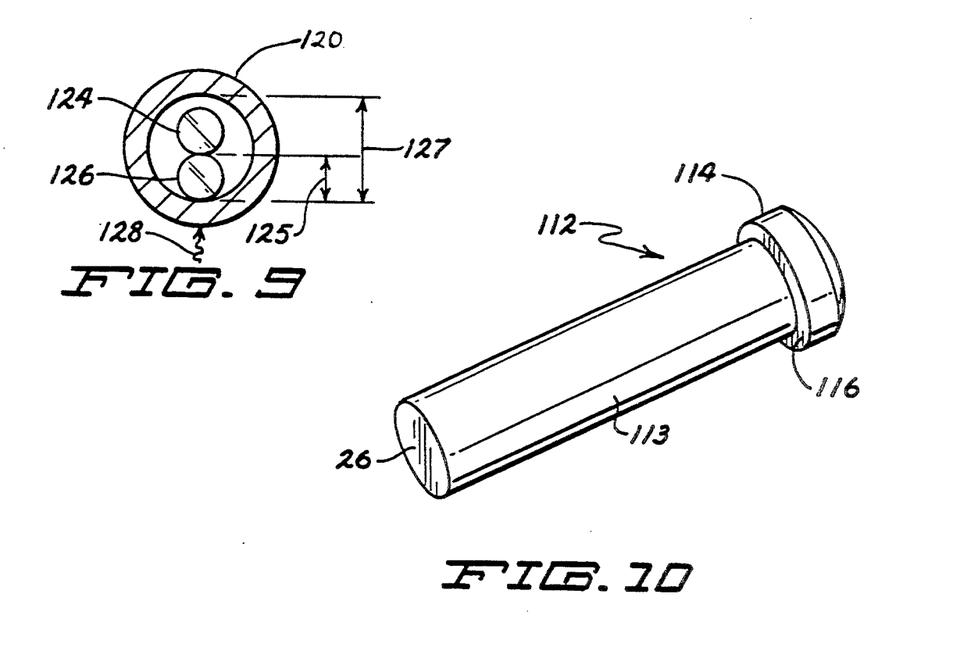
FIG. 9 shows a cross sectional view of the embodiment of FIG. 8 taken along cutting plane 9—9 thereof.
FIG. 10 shows a perspective view of the improved end plug shown in Figure 8.

FIGS. 8, 9 and 10 show an alternate embodiment of a pressure transducer assembly 100 with the present invention. Assembly 100 includes housing 102 having a pressure sensitive membrane 104, shown in phantom, securely wrapped therearound. Housing 100 has proximal and distal ends 106 and 108, respectively. Proximal end 106 includes an outwardly extending shoulder 110. The distal end 108 of assembly 100 is closed off by an end plug 112, best seen in FIG. 10. End plug 112 includes a shaft portion 113 snugly received within housing 102 and shoulder portion 114 that includes a sealing surface 116 that sealingly engages the end surface 118 of distal end 108 of housing 102. The shaft portion 113 and the shoulder portion 114 each have a substantially cylindrical configuration. Shaft portion 113 is sized such that its diameter is substantially the same as the inner diameter of the housing 102. The housing outer surface 120 thus provides a seat for membrane 104. The outer circumferential surfaces of shoulders 110 and 114 extend radially outwardly a greater distance than the outer surface of membrane 104. With this configuration, transducer assembly 100 may be inserted within a passageway within a tubing and protect the membrane; that is, the outer circumferential surfaces of shoulders 110 and 114 will engage the passage walls, thereby protecting membrane 104 from doing so. In this way, membrane 104 will not tend to roll backwards as the assembly 100 is inserted within the passage. As shown in the FIGS., end plug 112 may include an end 122 having a rounded or hemispheric configuration to aid in preventing any snagging of the transducer during its use. The shoulder portions 110 and 114 of both the housing 102 and the plug 112 may be made of a material different from the main component material of the housing and plug if desired.

Referring now to FIG. 9, an alternate method of inserting the fibers 124 and 126 within housing 102 will be described. In the embodiment shown in FIGS. 8 and 9, each fiber has a diameter 125 less than half the diameter of the housing inner diameter 127. Thus, as shown in FIG. 9, the fibers readily fit within the housing. To fix the fibers in location, heat is applied to the fibers by a heating element 128. Because the fibers are extruded under tension, the application of heat will cause the fibers to contract longitudinally and expand radially within the housing 102. Thus, the fibers will expand radially so as to fixably emplace themselves within the housing 102 upon the application of heat thereto. The foregoing method of fixing the fibers in place within housing 102 may be equally used with housing 12 and embodiment 10, as shown in FIG. 1. In the embodiment shown, it is presumed that the housing 102 is made of stainless steel and that it readily conducts heat. Where housings made of plastic are used, a circular heating element may be used to apply heat evenly around the circumference of the housing to make up for the lack of heat conductivity of the plastic material. As the fibers contract, they will assume substantially the same configuration as seen in FIGS. 1 and 2. That is, they will expand to closely engage the interior wall of the housing.

Additionally, heat may be used to polish the ends of the optical fibers prior to their insertion into the housing if desired. Thus a slight melting of the distal ends 22 and 24 of the fibers while pressing the fiber ends against a polished surface can act to cause a slight flowing of the polymer (such as PMMA) forming the fiber and thus remove any cutting marks that result from cutting the fibers to the correct length. The cutting marks can result in the deflection of light from the distal fibers rather than its transmission therethrough at substantially right angles to the surface. Because the amount of returned light is used to determine the pressure, loss of light due to scattering from cut marks is preferably mimimized. While possible to perform in the manner shown in FIG. 8, it is preferred that the fibers be exposed to the heating element prior to inserting within the transducer housing for purposes of polishing the ends thereof.

Figure 12:
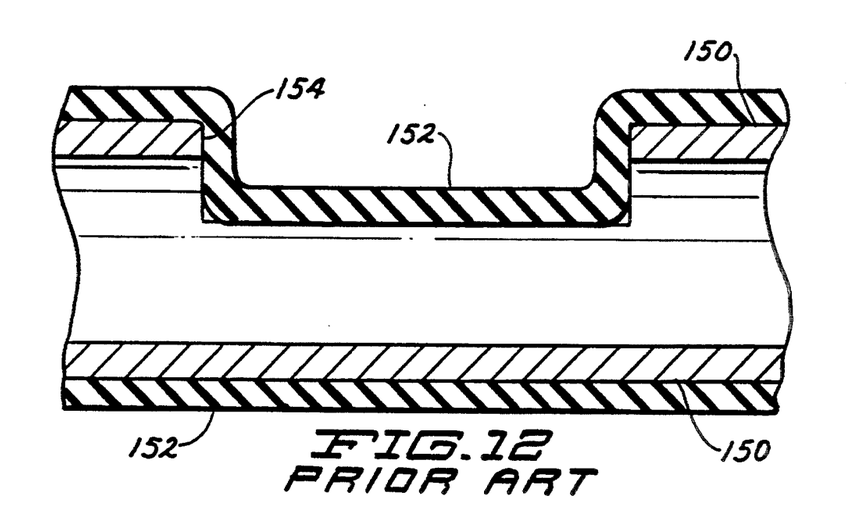
FIG. 12 shows in a partial cross sectional view a prior art fiber optic pressure transducer.
Figure 13:
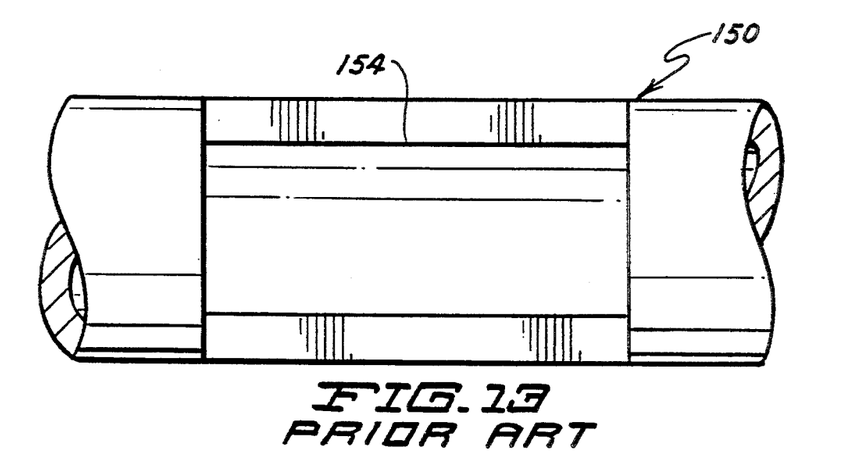
FIG. 13 shows a top plan view of the housing aperture shown in FIG. 12.

Referring now to prior art FIGS. 12 and 13, a prior art housing 150 is shown in first a top elevation alone and then in a side elevation view with a membrane 152 enveloping it. As seen in both Figures, housing 150 has an aperture 154 that has a substantially rectangular configuration; that is, when looked at in the top plan view as shown in FIG. 13, aperture 18 has substantially linear edges. Experience has shown that the square configuration for the aperture does not result in reproducible deformations. As shown in FIG. 12, this configuration for aperture 154 causes membrane 152 to deform inwardly in a similar rectangular configuration, thereby contributing to the hysteresis effects that must be compensated for.

FIG. 11 shows an improved housing 160 having an aperture 162 that has a substantially non-linear configuration when viewed in a top plan view; that is, the configuration is substantially oval. Aperture 162 can be formed by using a circle formed on the surface of housing 162 as a template. In actuality, a radius tool, such as an electro-discharge machine (EDM), wire EDM, radius cutter, radius grinder, etc., can be used to cut the aperture 162 in the housing as shown. The aperture has proximal and distal ends 164 and 166, with the distal ends of the fibers being aligned with proximal end 164 and each other. The configuration of aperture 162 may be used with either housing 12 or housing 102 in accordance with the present invention. Where the configuration of aperture 162 is used, the pressure sensitive membrane overlying it will deform more smoothly inwardly into the housing, as shown in FIG. 1. This will substantially eliminate the aforementioned hysteresis effect found in prior art fiber optic pressure transducers, thereby facilitating their use in measuring pressure and pressure changes.

While the foregoing embodiments have been shown without the use of potting or adhesive material to hold the fibers in place, such may also be used without departing from the scope of the present invention as shown at 170 (FIG. 2). In such circumstances an air passage in the form of a lumen 171 or simply an opening in the potting material 170 must be provided to maintain the pressure coupling of the inner surface of the pressure sensitive membrane 42 with the ambient atmosphere.

Figure 14:
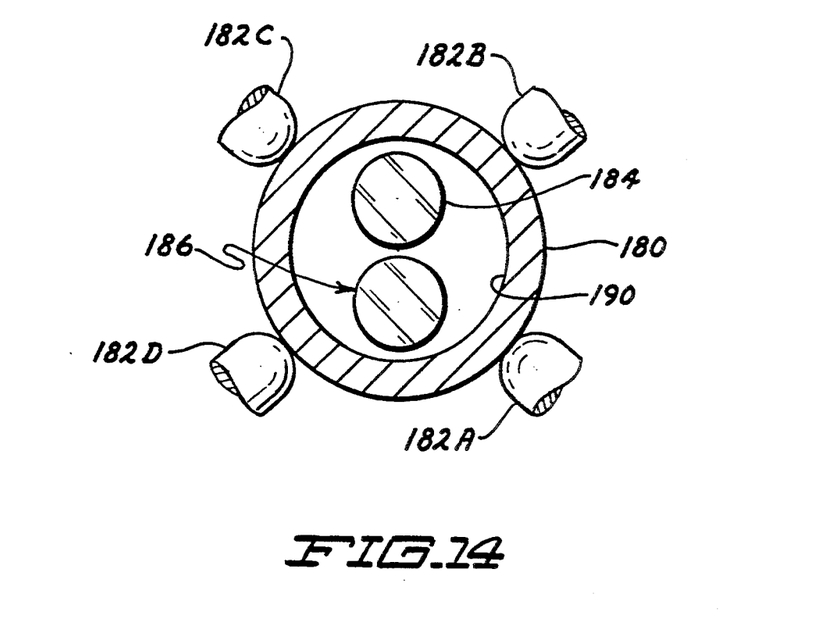
FIG. 14 shows alternative apparatus for selectively permanently deforming a housing of fiber optic pressure transducer to hold the fibers in place.
Figure 15:
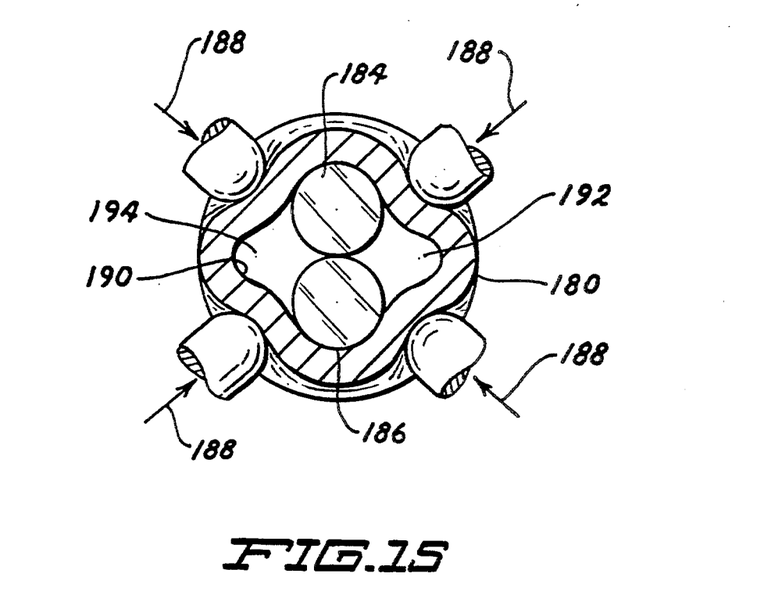
FIG. 15 shows the housing illustrated in FIG. 14 after its permanent deformation with fibers being held in place by the inner walls of the housing.

FIGS. 14 and 15 illustrate an alternative to the methods shown and described in FIGS. 2–9 for fixing the fibers in place within the housing. Thus, as seen in FIG. 14, a housing 180 may be disposed within a clamp having a plurality of pressure application points. As shown in FIG. 14, a clamp having four such pressure application points 182A, 182B, 182C, 182D may be used. A pair of fibers 184, 186 each having a diameter less than the inner radius of the housing will be put in place within the housing. Pressure as indicated by arrows 188 will be applied by the clamp substantially perpendicularly to the surface thereof as illustrated in FIG. 15. As shown in the Figure, the pressure application points are separated by approximately a quarter circumference of the outer housing surface. The selectively applied pressure is sufficiently great so that the housing material is stretched from its elastic region into its plastic region of its stress/strain curve and such that the pressure will selectively collapse or crush the housing 180 so that the fibers are confined therein within restricted semicircular passages having a radius only slightly less than that of the fibers. Stated otherwise, the housing 180 is collapsed around each of the fibers 184, 186 such that the inner surface 190 of the housing 180 firmly clenches the fibers approximately halfway around their circumference. The collapse of the housing 180 also forces the fibers 184, 186 into contact with each other as shown in FIG. 15, thereby holding the fibers firmly in place. As shown in that Figure, the collapse of the housing in the area of applied pressure creates two non-communicating passages 192, 194 in the area of the crimping of the housing. These two passages may serve as conduits for a separate and distinct air lumen if desired. If no separate and distinct lumen is required or desired, the passages 192 and 194 will serve as air passages to provide the necessary pressure coupling of the inner side of the pressure sensitive membrane with the ambient atmosphere.

The present invention having thus been described, other modifications, alterations, or substitutions may now suggest themselves to those skilled in the art, all of which are within the spirit and scope of the present invention. For example, while the present invention has been described relative to the use of a pair of fibers, it may also find use with single or multiple fibers forming the optical pathway. It is therefore intended that the present invention be limited only by the scope of the claims that follow below.

What is claimed is:

1. A method of manufacturing a fiber optic pressure transducer, said method comprising:
   providing a pair of light conducting optical fibers, each fiber having a diameter $d_1$;
   providing a housing for the optical fibers, the housing having proximal and distal ends and a substantially circular bore having a diameter $d_2$ such that $d_2 < 2d_1$;
   applying pressure to the housing so as to deform the housing such that the bore assumes a substantially non-circular configuration having a major axis $d_3$ such that $d_3 > 2d_1$;

inserting the pair of fibers into the bore of the housing from the proximal end thereof; and releasing the pressure applied to the housing so that the housing returns to its undeformed state.

2. The method of claim 1 wherein each of said fibers includes a distal end, said method further including:

affixing said distal ends of said fibers into a predetermined relationship to each other.

3. The method of claim 2 and including:

affixing said fiber ends in said predetermined location by applying an adhesive to said fibers.

4. The method of claim 1 wherein the housing includes an aperture and each fiber includes an end, said step of inserting further comprising:

disposing the fibers within the housing such that the fiber ends are substantially aligned with each other and the proximal end of the housing aperture.

5. The method of claim 1 wherein the step of providing a housing further comprises:

making an aperture in the housing such that the edge of the aperture has curvilinear configuration.

6. The method of claim 5 wherein said step of making said aperture includes cutting said aperture with a radius tool.

7. The method of claim 5 and further including:

placing an elastomeric membrane over the aperture under tension.

8. The method of claim 5 wherein the housing has a substantially cylindrical configuration and an outer diameter $d_4$ and wherein the elastomeric membrane has a substantially cylindrical configuration having an inner diameter $d_5$ wherein:

$$d_5 < d_4.$$

and wherein said step of placing an elastomeric membrane over the aperture comprises:

dilating the membrane such that $$d_5 > d_4.$$

9. The method of claim 8 wherein said dilating step includes soaking the membrane in an elastomer dilating solution.

10. The method of claim 8 wherein the membrane is made of silicone and wherein said dilating step includes soaking the membrane in a solution of freon.

11. The method of claim 8 wherein the membrane has inner and outer membrane surfaces and the said dilating step includes applying a differential pressure on the inner and outer surfaces of the membrane where the pressure on the inner membrane surface is greater than the pressure on the outer membrane surface.

12. The method of claim 4 and further including:

heating the ends of the fibers so as to provide a polished surface thereon.

13. The method of claim 4 and further including:

heating the ends of the fibers while pressing the fiber ends against a polished surface so as to provide a polished surface thereon.

14. The method of claim 4 and further including:

polishing the ends of the fibers so as to provide a non-light scattering surface thereon.

15. The method of claim 5 and further including:

placing an elastomeric membrane over the aperture under tension.

16. The method of claim 1 and further including:

heating the ends of the fibers so as to provide a polished surface thereon.

17. The method of claim 1 and further including:

heating the ends of the fibers while pressing the fiber ends against a polished surface so as to provide a polished surface thereon.

18. The method of claim 16 and further including:

polishing the ends of the fibers so as to provide a non-light scattering surface thereon.

19. The method of claim 1 wherein the housing includes an aperture, said method further including:

placing an elastomeric membrane over the aperture under tension.

20. A method of manufacturing a fiber optic pressure transducer comprising a housing enclosing a pair of optical fibers and a pressure sensitive membrane, said method comprising the steps of:

providing a pair of optical fibers, each fiber having a diameter $d_1$ and a distal end;

providing the housing, said housing having proximal and distal ends and a central housing bore having a bore diameter $d_2$ such that $d_2 < 2d_1$;

inserting the fibers into the proximal end of the housing;

aligning the ends of the fibers with each other; and fixing the fibers in the housing at a preselected location.

21. The method of claim 20 wherein said fixing step comprises heating the fibers such that the fibers contract longitudinal and expand radially.

22. The method of claim 20 wherein said step of providing the housing includes making an aperture in the wall of the housing.

23. The method of claim 22 wherein said fixing step comprises heating the fibers such that the fibers contract longitudinal and expand radially.

24. The method of claim 23 and including the step of placing an elastomeric membrane over the aperture in tension.

25. The method of claim 24 wherein the housing has an outer diameter $d_4$ and the elastomeric membrane has a substantially cylindrical configuration having an inner diameter $d_5$ wherein:

$$d_5 < d_4$$

and wherein said step of placing an elastomeric membrane over the aperture comprises:

dilating the membrane such that $$d_5 > d_4.$$

26. The method of claim 25 wherein the membrane is made of silicone and wherein said dilating step includes soaking the membrane in a solution of freon.

27. The method of claim 25 wherein said dilating step includes soaking the membrane in an elastomer dilating solution.

28. The method of claim 25 wherein the membrane has inner and outer membrane surfaces and the said dilating step includes applying a differential pressure on the inner and outer surfaces of the membrane where the pressure on the inner membrane surface is greater than the pressure on the outer membrane surface.

29. The method of claim 20 and including the step of disposing a reflector within the housing distally of the ends of the fibers.

30. The method of claim 29 wherein said fixing step comprises heating the fibers such that the fibers contract longitudinal and expand radially.

31. The method of claim 30 wherein said step of providing the housing includes making a aperture in the wall of the housing.

32. The method of claim 20 wherein said step of fixing the fibers in place comprises:
applying pressure to said housing in a predetermined area to collapse the housing around the fibers such that the inner surface of the housing closely embraces said fibers.

33. The method of claim 32 wherein said housing is collapsed to form two passages substantially semicircular in cross section therein with said fibers being disposed within said semicircular passages.

34. The method of claim 22 wherein said making step comprises making the aperture so that the aperture has a curvilinear edge.

35. The method of claim 34 wherein said fixing step comprises heating the fibers such that the fibers contract longitudinal and expand radially.

36. A fiber optic pressure transducer comprising:
a housing have proximal and distal ends, said housing having inner and outer surfaces, said inner surface defining a substantially circular bore having a diameter $d_1$, said housing further including an aperture extending between said inner and outer surfaces, wherein said housing further includes:
a body portion having a substantially cylindrical configuration and having inner and outer body diameters, said outer diameter partially defining said outer surface;
a proximal end portion having a substantially cylindrical configuration and having an outer end portion diameter greater than the outer body diameter and partially defining said outer surface; and
an end plug received within said housing bore, said end plug including a shaft portion having a substantially cylindrical configuration and a shoulder portion having a substantially cylindrical configuration, wherein said shaft portion has a diameter substantially equal to said housing inner diameter and wherein said proximal end portion and said shoulder portion having a substantially equal height, wherein said outer surface of said body portion comprises a seat for said pressure sensitive membrane;
a pair of optical fibers, each fiber having a distal end, said fibers being received within said bore and fixed therein such that said distal ends are substantially aligned with each other and with the proximal end of said aperture;
a reflector disposed within said housing distally of the distal end of said aperture in optically coupling relation to said fibers; and
a pressure sensitive membrane engaging said housing outer surface and disposed over said aperture in a pre-stressed condition.

37. The transducer of claim 36 wherein said pressure sensitive membrane has a thickness less than the height of said shoulders.

38. The transducer of claim 36 wherein said shoulder portion includes an end having a substantially hemispheric configuration.

39. The transducer of claim 36 wherein said aperture has a substantially non-linear configuration.

* * * * *